United States Patent
Schnaibel et al.

(10) Patent No.: US 6,626,033 B1
(45) Date of Patent: Sep. 30, 2003

(54) METHOD FOR OPERATING AN ACCUMULATOR-TYPE CATALYTIC CONVERTER OF AN INTERNAL COMBUSTION ENGINE

(75) Inventors: Eberhard Schnaibel, Hemmingen (DE); Oliver Schlesiger, Asperg (DE); Andreas Koring, Ludwigsburg (DE); Holger Bellmann, Ludwigsburg (DE); Andreas Blumenstock, Ludwigsburg (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 09/914,570

(22) PCT Filed: Nov. 18, 2000

(86) PCT No.: PCT/DE00/04080

§ 371 (c)(1),
(2), (4) Date: Aug. 31, 2001

(87) PCT Pub. No.: WO01/49988

PCT Pub. Date: Jul. 12, 2001

(30) Foreign Application Priority Data

Dec. 31, 1999 (DE) .......................................... 199 63 921

(51) Int. Cl.$^7$ .............................................. G01M 15/00
(52) U.S. Cl. ..................... 73/118.1; 73/23.31; 73/35.02
(58) Field of Search ................................. 73/35.02, 116, 73/117.2, 117.3, 118.1, 23.31, 23.32

(56) References Cited

U.S. PATENT DOCUMENTS

| 5,724,808 | A | | 3/1998 | Ito et al. |
| 6,145,303 | A | * | 11/2000 | Strehlau et al. ............... 60/274 |
| 6,494,036 | B2 | * | 12/2002 | Schnaibel et al. ............ 60/277 |
| 2002/0134077 | A1 | * | 9/2002 | Schnaibel et al. ............ 60/301 |

FOREIGN PATENT DOCUMENTS

| EP | 0 858 837 | 8/1998 |
| EP | 0 860 595 | 8/1998 |

* cited by examiner

Primary Examiner—Eric S. McCall
(74) Attorney, Agent, or Firm—Walter Ottesen

(57) ABSTRACT

An internal combustion engine, especially for a motor vehicle, is described, which is provided with a storage catalytic converter which can be loaded with and unloaded of nitrogen oxides. Several states of deterioration (points 13) of the storage catalytic converter can be determined by the control apparatus. A sulphur content of the fuel used can be determined by the control apparatus from sequential states of deterioration (points 13).

7 Claims, 2 Drawing Sheets

METHOD FOR OPERATING AN ACCUMULATOR-TYPE CATALYTIC CONVERTER OF AN INTERNAL COMBUSTION ENGINE

FIELD OF THE INVENTION

The invention relates to a method for operating a storage catalytic converter of an internal combustion engine, especially of a motor vehicle, wherein the catalytic converter is loaded with and unloaded of nitrogen oxides and wherein the storage capability of the storage catalytic converter is reduced because of sulphur contained in the fuel used. Likewise, the invention relates to a control apparatus for an internal combustion engine, especially of a motor vehicle, as well as an internal combustion engine especially for a motor vehicle.

BACKGROUND OF THE INVENTION

A method of this kind, a control apparatus of this kind and an internal combustion engine of this kind are, for example, known for a so-called gasoline direct injection. There, the fuel is injected into the combustion chamber of the engine in a homogeneous operation during the induction phase or in a stratified operation during the compression phase. The homogeneous operation is preferably provided for the full-load operation of the engine while the stratified operation is suitable for the idle and part-load operation. In such a direct injecting internal combustion engine, a switchover is made between the mentioned operating modes, for example, in dependence upon the requested torque.

It is especially necessary that a storage catalytic converter be present for carrying out stratified operation. With the storage catalytic converter, developing nitrogen oxides can be intermediately stored in order to reduce the same in a three-way catalytic converter during a subsequent homogeneous operation. This storage catalytic converter is loaded with the nitrogen oxides in the stratified operation and is again unloaded in the homogeneous operation. This loading and unloading leads to a deterioration of the storage catalytic converter caused by sulphur and therefore leads to a reduction of the storage capability thereof. The deterioration caused by sulphur is based on the sulphur content of the fuel with which the engine is operated.

SUMMARY OF THE INVENTION

It is an object of the invention to provide a method for operating a storage catalytic converter of an internal combustion engine wherein the deterioration of the storage catalytic converter caused by sulphur can be better considered.

This object is solved with the method of the invention of the kind initially mentioned herein in that several states of deterioration of the storage catalytic converter are determined and that a sulphur content of the fuel used is determined from the states of deterioration which follow one another. The object is correspondingly solved with a control apparatus and an internal combustion engine, each of which are of the kind referred to initially herein.

With the invention, the possibility is provided to determine the sulphur content of the fuel used without the use of a special sensor. This presents a significant cost savings. The determined sulphur content can then be used further by the control apparatus in the control (open loop and/or closed loop) of the engine. An improvement of the operation of the engine overall results therefrom.

It is especially advantageous when an ascending slope of the sequential deterioration states is determined and when the sulphur content is determined in dependence upon this slope. This defines an especially simple and therefore rapid way as to how the invention can be carried out.

In an advantageous embodiment of the invention, a specific sulphur content for a specific fuel is determined from a fuel consumption between two regenerations and from a sulphur discharge during a regeneration. In this way, a sulphur content is determined which can be set into relationship with a corresponding ascending slope of the sequential states of deterioration. From this relationship, a conclusion can be drawn from other ascending slopes as to corresponding other sulphur contents.

In an advantageous embodiment of the invention, the time point of a sulphur regeneration is determined in dependence upon the sulphur content. In this way, a very precise control (open loop and/or closed loop) of the engine can be achieved especially with a view toward the least possible exhaust-gas emissions.

In a further advantageous embodiment of the invention, the intensity of a regeneration is determined in dependence upon the sulphur content. Here also, an improvement of the control (open loop and/or closed loop) of the engine with a view to the exhaust-gas emissions and the fuel consumption is obtained.

Of special significance is the realization of the method of the invention in the form of a control element which is provided for a control apparatus of an internal combustion engine, especially of a motor vehicle. A program is stored on the control element which can be run on a computing apparatus, especially on a microprocessor, and is suitable for executing the method in accordance with the invention. In this case, the invention is therefore realized by a program stored on the control element so that this control element, which is provided with the program, defines the invention in the same way as the method for whose execution the program is suitable. As a control element, an electric storage medium is especially applicable, for example, a read-only-memory or a flash memory.

Further features, possibilities of application and advantages of the invention will become apparent from the description of the embodiments of the invention which follow and which are shown in the figures of the drawing. All described or illustrated features form the subject matter of the invention individually or in any combination independently of the composition thereof in the patent claims or their dependency as well as independently of their formulation in the description or their illustration in the drawing.

BRIEF DESCRIPTION OF THE DRAWING

The invention will now be described with respect to the drawings where in.

DESCRIPTION OF THE PREFERRED EMBODIMENTS OF THE INVENTION

Figure 1:
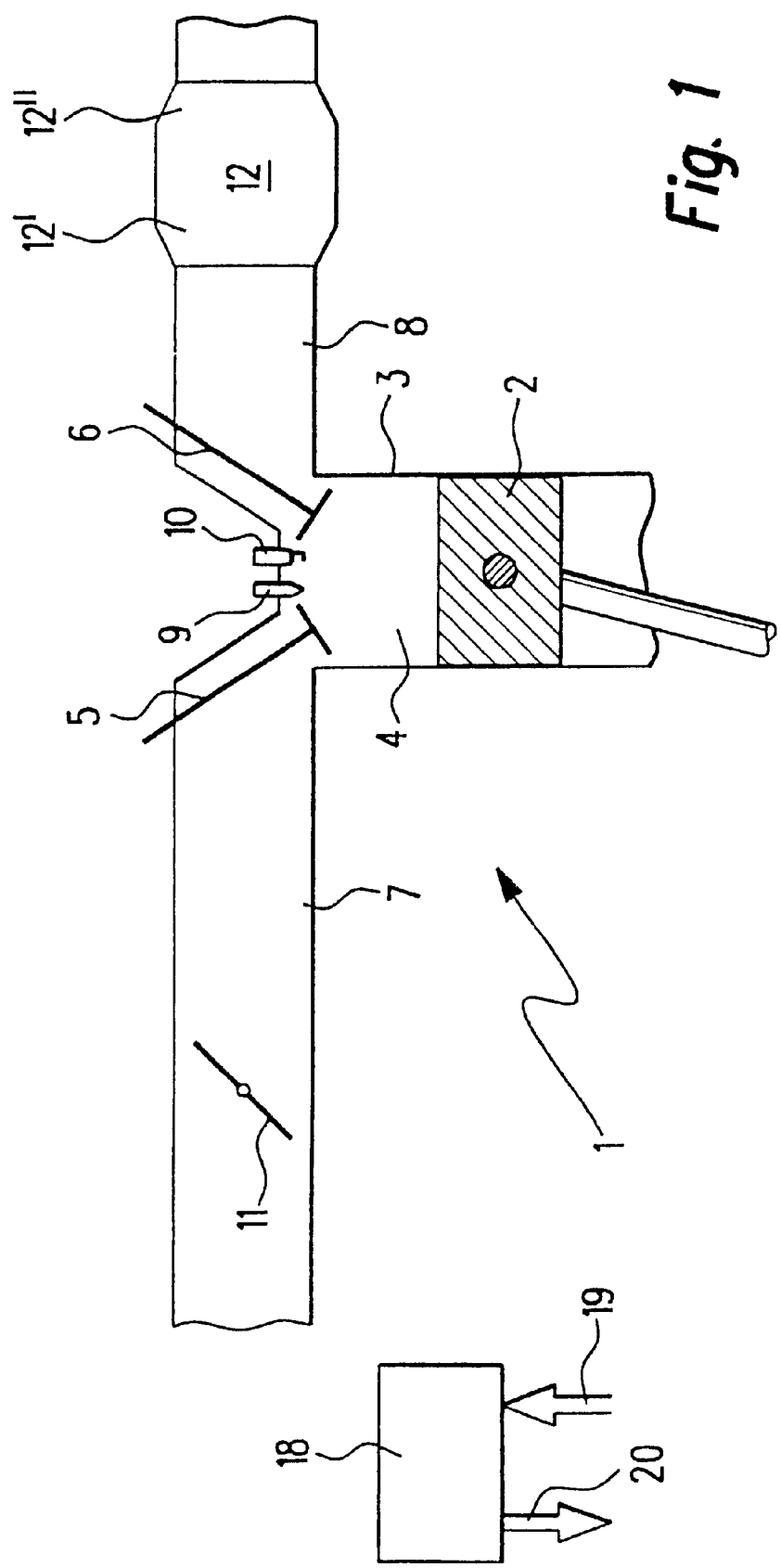
FIG. 1 shows a schematic illustration of an embodiment of an internal combustion engine according to the invention; and, FIG. 2 is a schematic diagram of the deterioration of the storage catalytic converter of the internal combustion engine of FIG. 1.

In FIG. 1, an internal combustion engine 1 of a motor vehicle is illustrated wherein a piston 2 is movable back and forth in a cylinder 3. The cylinder 3 is provided with a combustion chamber 4 which, inter alia, is delimited by the piston 2, an inlet valve 5 and an outlet valve 6. An intake manifold 7 is coupled to the inlet valve 5 and an exhaust-gas pipe 8 is coupled to the outlet valve 6.

An injection valve 9 and a spark plug 10 project into the combustion chamber 4 in the region of the inlet valve 5 and outlet valve 6. Fuel can be injected into the combustion chamber 4 via the injection valve 9. The fuel can be ignited in the combustion chamber 4 with the spark plug 10.

A rotatable throttle flap 11 is accommodated in the intake manifold 7 via which air can be supplied to the intake manifold 7. The quantity of the air supplied is dependent upon the angular position of the throttle flap 11. A catalytic converter 12 is accommodated in the exhaust-gas pipe 8 and functions to purify the exhaust gases arising from the combustion of the fuel.

The catalytic converter 12 is a storage catalytic converter 12' which is combined with a three-way catalytic converter 12". The catalytic converter 12 is thereby, inter alia, provided to intermediately store nitrogen oxides (NOx).

Input signals 19 are applied to a control apparatus 18 and these signals represent operating variables of the engine 1 measured by sensors. The control apparatus 18 generates output signals 20 with which the performance of the engine 1 can be influenced via actuators and/or positioning devices. The control apparatus 18 is, inter alia, provided for controlling (open loop and/or closed loop) the operating variables of the engine 1. For this purpose, the control apparatus 18 is provided with a microprocessor which has a program stored in a storage medium, especially in a flash memory, and the program is suitable for carrying out the above-mentioned control (open loop and/or closed loop).

In a first operating mode, a so-called homogeneous operation of the engine 1, the throttle flap 11 is opened or closed in dependence upon the desired torque. The fuel is injected into the combustion chamber 4 by the injection valve 9 during an induction phase caused by the piston 2. The injected fuel is swirled by the air inducted simultaneously via the throttle flap 11 and is thereby essentially uniformly distributed in the combustion chamber 4. Thereafter, the air/fuel mixture is compressed during the compression phase in order to then be ignited by the spark plug 10. The piston 2 is driven by the expansion of the ignited fuel. In homogeneous operation, the developed torque is, inter alia, dependent upon the position of the throttle flap 11. The air/fuel mixture is adjusted as closely as possible to lambda equal one with the view to a reduced development of toxic substances.

In a second operating mode, a so-called stratified operation of the engine 1, the throttle flap 11 is opened wide. The fuel is injected into the combustion chamber 4 by the injection valve 9 during a compression phase caused by the piston 2. The fuel is injected spatially in the immediate vicinity of the spark plug 10 as well as at a suitable interval in time ahead of the ignition time point. Then, with the aid of the spark plug 10, the fuel is ignited so that the piston 2 is driven in the next work phase by the expansion of the ignited fuel. In stratified operation, the arising torque is substantially dependent upon the injected fuel mass. The stratified operation is essentially provided for the idle operation and for the part-load operation of the engine 1.

The storage catalytic converter 12' of the catalytic converter 12 is loaded with nitrogen oxides during the stratified operation. In the subsequent homogeneous operation, the storage catalytic converter 12' is again unloaded and the nitrogen oxides are reduced by the three-way catalytic converter 12".

Over time, the storage catalytic converter 12' takes on sulphur during its continuous loading and unloading with nitrogen oxides. This leads to a limiting of the storage capability of the storage catalytic converter 12' which is characterized in the following as deterioration.

Figure 2:
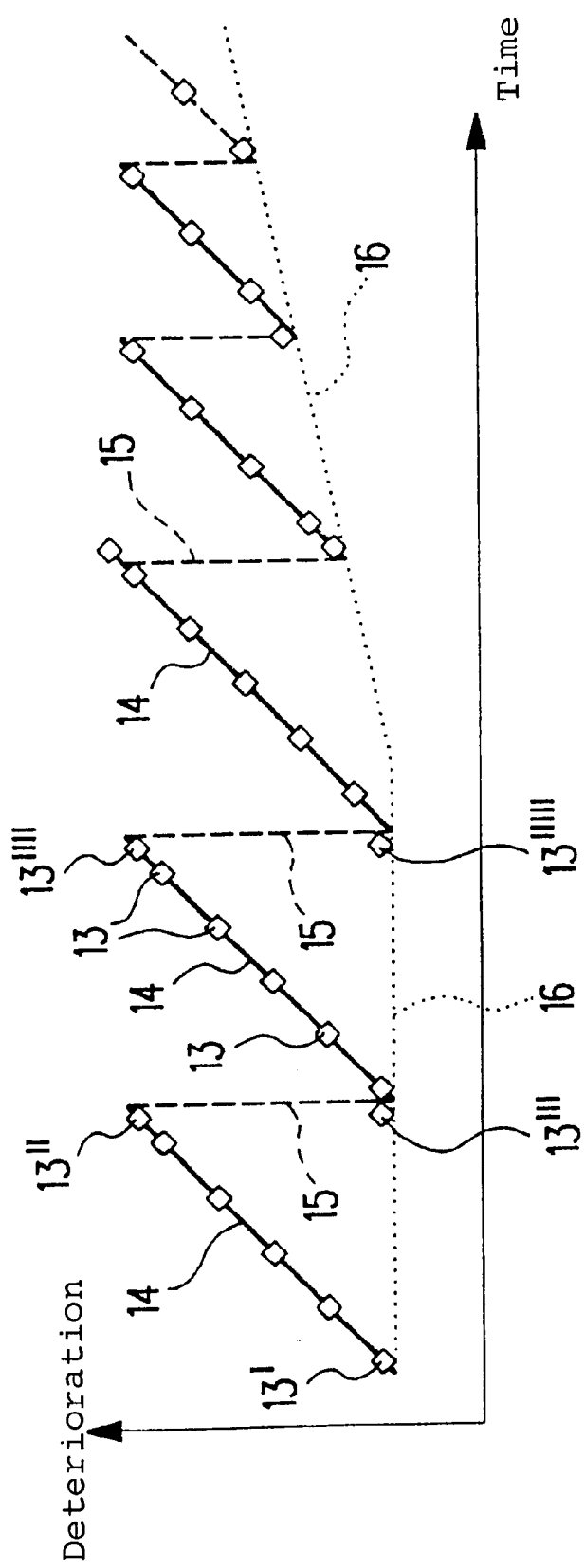

In FIG. 2, the deterioration of the storage catalytic converter 12' is plotted as a function of time. A value for this deterioration can be determined by the control apparatus 18 via appropriate diagnostic methods. Such diagnostic methods can, for example, be based on the measurement of NOx emissions downstream of the storage catalytic converter 12'.

In FIG. 2, the execution of diagnostic methods of this kind and the value of a deterioration resulting therefrom is characterized in each case by point 13. These states of deterioration of the points 13 are connected to each other by a solid line 14. The solid line 14 thereby defines the trace of deterioration.

A first point 13' defines a first time execution of a diagnosis of the storage catalytic converter 12' with which a first state of deterioration is determined. At the next time points, additional diagnoses are carried out from which further states of deterioration result. These additional states of deterioration provide a trace of the deterioration because of the ever increasing values and this trace corresponds to a deterioration of the storage catalytic converter 12'. As already mentioned, the storage capability of the storage catalytic converter 12' is reduced by the deterioration.

At point 13", a state of deterioration is reached based upon which a sulphur regeneration of the storage catalytic converter 12' is carried out by the control apparatus 18. This sulphur regeneration is indicated in FIG. 2 by the broken line 15 and can, for example, be achieved with a rich operating state of the engine 1 with a simultaneously high exhaust-gas temperature. In this regeneration, the sulphur is discharged from the storage catalytic converter 12'. This leads to a substantial return of the storage catalytic converter 12' into its initial state, especially into its initial storage capability. This is shown in FIG. 2 by the point 13''' which corresponds approximately to the initial state of deterioration of the storage catalytic converter 12'.

Thereafter, the above-mentioned diagnostic methods are carried out anew by the control apparatus 18 and these methods lead to additional points 13 and therefore to an additional line 14. At point 13'''', a regeneration of the storage catalytic converter 12' is again carried out by the control apparatus 18 9 corresponding to line 15 and this regeneration, in turn, leads to point 13''''' and therefore approximately to an attainment of the initial storage capability thereof.

As explained, the deterioration discussed up to now arises because of the storage of sulphur in the storage catalytic converter 12'. The sulphur is in the fuel, which is supplied to the engine 1, that is, in the exhaust gas arising from the fuel. This deterioration is reversible and can be substantially cancelled by the described regeneration.

In addition to the above reversible deterioration, the storage catalytic converter 12' is subjected also to a non-reversible deterioration. This non-reversible deterioration arises because of the continuous loading and unloading of the storage catalytic converter 12' and ultimately defines the actual natural deterioration of the storage catalytic converter 12'.

In FIG. 2, the natural, non-reversible deterioration is shown with line 16. This line 16 results from the points 13', 13''', 13''''', et cetera, that is, always from those states of deterioration which the storage catalytic converter 12' exhibits directly after a sulphur regeneration.

As can be seen in FIG. 2, the line 16 climbs slowly starting from the point 13'''". The ascending slope of line 16 is significantly less than the ascending slope of line 14. The climb of line 16 is synonymous with a permanent, continuously diminishing storage capability of the storage catalytic converter 12'. This is also seen in that the restoration of the storage capability of the storage catalytic converter 12' because of a sulphur regeneration continuously diminishes, that is, the lengths of lines 15 decrease.

As mentioned, the loss of storage capability of the storage catalytic converter 12' which results from the climbing line 16, is not reversible. This has the consequence that the storage capability goes to zero over the long term. The storage catalytic converter 12' must then be exchanged.

As already mentioned, the ascending slope of the line 16 of the natural non-reversible deterioration is significantly less than the ascending slope of the line 14 of the reversible deterioration caused by the sulphur. From these different ascending slopes, the control apparatus 18 can distinguish the natural, non-reversible deterioration from the reversible deterioration caused by sulphur.

As likewise explained, the slope of the line 14 relates to the sulphur-caused deterioration of the storage catalytic converter 12'. This slope defines an index for the sulphur content of the fuel which leads to the sulphur-caused deterioration. The control apparatus 18 can draw a conclusion as to the sulphur content of the used fuel from the ascending slope of line 14.

For this purpose, the control apparatus 18 determines the fuel consumption between two sequential regenerations of the storage catalytic converter 12'. Furthermore, the control apparatus 18 determines that sulphur quantity which is discharged from the storage catalytic converter 12' during a regeneration when utilizing a specific fuel. An index for this can be the difference between two points 13" and 13'''. From these two values, the control apparatus 18 computes the sulphur content for the specific fuel used. A one-time determination can be adequate with the above-mentioned values.

Thereafter, the control apparatus 18 determines which ascending slope of the lines 14 results from the above-mentioned computed sulphur content. In this way, a relationship is established between the ascending slope of the lines 14 and the sulphur content of the specific fuel. If the sulphur content changes at a later time point, for example, because of another fuel used, then the ascending slope of lines 14 also changes. This is determined by the control apparatus 18. From the changed ascending slope of the lines 14, the control apparatus 18 can draw a conclusion as to the changed sulphur content.

The control apparatus 18 is thereby in a position to determine the sulphur content of the fuel used from the slope of the lines 14.

With a knowledge of the sulphur content of the fuel used, the control apparatus 18 can influence the regeneration of the storage catalytic converter 12'. Thus, the time point of the regeneration and/or the intensity of the regeneration, especially the temperature and the quantity of the regeneration means utilized, can be determined by the control apparatus 18 in dependence upon the sulphur content of the fuel used.

The control apparatus can especially simulate or model the storage of the sulphur in the storage catalytic converter 12' during the operation of the engine. With the aid of this determined sulphur content, the control apparatus 18 can compute at each time point on the basis of the other operating variables of the engine 1 that amount of sulphur which has been brought already into the storage catalytic converter 12'. From this, the control apparatus 18 can determine the time point and also the intensity of the next regeneration of the storage catalytic converter 12'.

What is claimed is:

1. A method for operating a storage catalytic converter of an internal combustion engine of a motor vehicle, the storage catalytic converter having a storage capability and the method comprising the steps of:

loading the storage catalytic converter with nitrogen oxides and unloading the storage catalytic converter of nitrogen oxides;

reducing the storage capability of the storage catalytic converter because of sulphur contained in the fuel used; and, determining several sequential states of deterioration (points 13) of the storage catalytic converter and determining a sulphur content of the fuel used from the sequential states of deterioration (points 13).

2. The method of claim 1, wherein an ascending slope of the sequential states of deterioration (points 13) is determined and that the sulphur content is determined in dependence upon this slope.

3. The method of claim 1, wherein a specific sulphur content is determined for a specific fuel from a fuel consumption between two regenerations and from a sulphur discharge during a regeneration.

4. The method of claim 1, wherein a time point of a sulphur regeneration is determined in dependence upon the sulphur content.

5. The method of claim 1, wherein an intensity of a regeneration is determined in dependence upon the sulphur content.

6. A control apparatus for an internal combustion engine of a motor vehicle, the engine having a storage catalytic converter which can be loaded with and unloaded of nitrogen oxides and whose storage capability is reduced because of sulphur contained in the fuel used, the control apparatus comprising means for determining several states of deterioration (points 13) of the storage catalytic converter; and means for determining a sulphur content of the fuel used from sequential states of deterioration (points 13).

7. An internal combustion engine of a motor vehicle, the internal combustion engine comprising: a storage catalytic converter which can be loaded with and unloaded of nitrogen oxides and whose storage capability is reduced because of sulphur contained in the fuel used; a control apparatus for determining several states of deterioration (points 13) of the storage catalytic converter and for determining a sulphur content of the fuel used which is determined from sequential states of deterioration (points 13).

* * * * *